United States Patent [19]

Schwindeman et al.

[11] Patent Number: 5,654,371
[45] Date of Patent: *Aug. 5, 1997

[54] ANIONIC POLYMERIZATION PROCESS USING FUNCTIONALIZED INITIATORS

[75] Inventors: James A. Schwindeman, Lincolnton; Conrad W. Kamienski; Robert C. Morrison, both of Gastonia, all of N.C.

[73] Assignee: FMC Corporation, Philadelphia, Pa.

[ * ] Notice: The term of this patent shall not extend beyond the expiration date of Pat. No. 5,565,526.

[21] Appl. No.: 460,308

[22] Filed: Jun. 2, 1995

Related U.S. Application Data

[63] Continuation-in-part of Ser. No. 436,780, May 8, 1995, Pat. No. 5,565,526, which is a continuation-in-part of Ser. No. 242,518, May 13, 1994, abandoned.

[51] Int. Cl.$^6$ .................... C08F 4/46; C08F 8/00
[52] U.S. Cl. .................... 525/272; 525/275; 525/288; 525/292; 525/332.3; 525/332.9; 525/333.1; 525/333.2; 525/333.3; 525/333.5; 525/338; 525/342; 525/343; 525/371; 525/383; 525/384; 525/388; 526/178; 526/181
[58] Field of Search .................... 526/178, 181; 525/105, 123, 184, 272, 292, 296, 359.2, 385, 338, 371, 383, 384, 275, 288, 332.3, 332.9, 333.1, 333.2, 333.3, 333.5, 342, 343

[56] References Cited

U.S. PATENT DOCUMENTS

| | | | |
|---|---|---|---|
| 3,326,881 | 6/1967 | Uraneck et al. | 526/181 X |
| 3,862,100 | 1/1975 | Halasa et al. | 526/181 |
| 5,331,058 | 7/1994 | Shepherd et al. | 525/332.3 |
| 5,362,699 | 11/1994 | Shepherd et al. | 526/173 X |

*Primary Examiner*—Fred Teskin
*Attorney, Agent, or Firm*—Bell Seltzer Park & Gibson

[57] ABSTRACT

A process for the preparation of hydrocarbon solutions of monofunctional ether initiators of the following general structure:

$$M—Q_n—Z—OA(R^1R^2R^3) \qquad (II)$$

wherein M is defined as an alkali metal, selected from the group consisting of lithium, sodium and potassium, Q is a saturated or unsaturated hydrocarbyl group derived by incorporation of a compound selected from the group consisting of conjugated diene hydrocarbons and alkenylsubstituted aromatic hydrocarbons; Z is defined as a branched or straight chain hydrocarbon tether or connecting group which contains 3–25 carbon atoms, optionally containing aryl or substituted aryl groups; A is an element selected from Group IVa of the periodic table and $R^1$, $R^2$, and $R^3$ are independently selected from hydrogen, alkyl, substituted alkyl, aryl or substituted aryl groups, and n is an integer from 1 to 5. monofunctional ethers produced by the process, use of the initiators in a polymerization process and polymers produced by the polymerization process.

4 Claims, No Drawings

ANIONIC POLYMERIZATION PROCESS USING FUNCTIONALIZED INITIATORS

This application is a continuation in part of U.S. application Ser. No. 08/436,780, filed May 8, 1995 now U.S. Pat. No. 5,565,526 and which application is a continuation in part of U.S. application Ser. No. 08/242,518 filed May 13, 1994, now abandoned.

This invention concerns a process for the polymerization of olefinic-containing monomers, polymers produced by this process, novel anionic initiators for use in the polymerization process and a process for making the anionic initiators.

Useful polymeric products are obtained by polymerizing olefinic-containing monomers in the presence of an organo-alkali metal initiator and subsequently reacting the resulting polymer, containing an active alkali metal end group or groups, with a reagent which will couple the polymer molecules or replace the alkali metal with more stable reactive end groups.

Monofunctional silyl ether initiators, containing alkali metal end groups useful in effecting such polymerization reactions are disclosed in Great Britain published patent application 2,241,239, published Aug. 28, 1991. These monofunctional silyl ether initiators were demonstrated to be useful in producing polybutadienes having desirable characteristics such as a molecular weight of typically 1,000 to 10,000, 1–4 content of typically 90%, etc.

A co-pending U.S. application Ser. No. 198,914, filed Feb. 18, 1994 discloses a process for the preparation of hydrocarbon solutions of monofunctional ether initiators of the following general structure:

$$M-Z-O-C(R_1R_2R_3) \qquad (I)$$

wherein M is defined as an alkali metal, preferably lithium; Z is defined as a branched or straight chain hydrocarbon tether group which contains 3–25 carbon atoms, optionally containing aryl or substituted aryl groups; and $R_1$, $R_2$, and $R_3$ are independently defined as hydrogen, alkyl, substituted alkyl, aryl or substituted aryl, and their employment as initiators in the anionic polymerization of olefin containing monomers in an inert, hydrocarbon solvent. The process reacts selected omega-protected-1-haloalkyls whose alkyl groups contain 3 to 25 carbon atoms, with lithium metal at a temperature between about 35° C. and about 130° C., preferably at the reflux temperature of an alkane or cycloalkane reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenylaromatic or a 1,3-diene at a temperature of about −30° C. to about +60° C. The polymerization reaction proceeds from initiation to propagation and is finally terminated with appropriate reagents so that the polymer is monofunctionally or di-functionally terminated. The polymers may have a molecular weight range of about 1000 to 10,000 but the molecular weight can be higher. Typically 5 to 50 milli-moles of initiator is used per mole of monomer.

The precursor omega-protected 1-haloalkyls (halides) are prepared from the corresponding haloalcohol by the standard literature methods. For example, 3-(1,1-dimethylethoxy)-1-chloropropane was synthesized by the reaction of 3-chloro-1-propanol with 2-methylpropane according to the method of A. Alexakis, M. Gardette, and S. Colin, Tetrahadron Letters, 29, 1988, 2951. 6-(benzyloxy)-1-chlorohexane and the like were prepared from 6-chloro-1-hexanol and benzyl chloride, under phase transfer conditions, in keeping with the teachings of H. H. Freeman and R. A. Dubois, Tetrahadron Letters, 1975, 3251. The compound 4-(methoxy)-1-chlorobutane, and the higher analogous, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Monofunctional ether initiators prepared in accord with this earlier process can include, but are not limited to, 3-(1,1-dimethylethoxy)-1-propyllithium, 5-(1,1-dimethylethoxy)-1-pentyllithium, 6-(benzyloxy)-1-hexyllithium, 3-(1,1-dimethylethoxy)-2,2-dimethyl-1-propyllithium, 4-(1,1-dimethylethoxy)-1-butyllithium, 6-(1,1-dimethylethoxy)-1-hexyllithium, 8-(1,1-dimethylethoxy)-1-octyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 5-(triphenylmethoxy)-1-pentyllithium, 6-(triphenylmethoxy)1-hexyllithium, and 8-(triphenylmethoxy)-1-octyllithium. These monofunctional ether initiators have rather limited hydrocarbon solubility.

The present process provides monofunctional ether initiators with increased hydrocarbon solubility, a process for the production of these monofunctional ether initiators, an anionic polymerization process for polymerizing olefin containing monomers employing these new initiators and polymers produced by the new anionic polymerization process.

The monofunctional ether initiators, of this invention, having increased solubility in hydrocarbons are of the formula:

$$M-Q_n-Z-OA(R^1R^2R^3) \qquad (II)$$

wherein M is defined as an alkali metal, preferably lithium; Q is a saturated or unsaturated hydrocarbyl group derived by incorporation of a compound selected from the group consisting of conjugated diene hydrocarbons and alkenylsubstituted aromatic hydrocarbons; Z is defined as a branched or straight chain hydrocarbon tether or connecting group which contains 3–25 carbon atoms, optionally containing aryl or substituted aryl groups; A is an element selected from the group consisting of carbon and silicon and $R^1$, $R^2$, and $R^3$ are independently selected from hydrogen, alkyl, substituted alkyl, aryl or substituted aryl groups, and n is an integer from 1 to 5.

The process aspect of this invention for producing the initiators of formula (II) reacts selected omega-protected-1-haloalkyls where the connecting group groups contain 3 to 25 carbon atoms, with an alkali metal, preferably lithium, at a temperature between about 35° C. and about 130° C., preferably at the solvent reflux temperature, to form a monofunctional lithium ether initiator (of formula I) which is then reacted with a conjugated diene hydrocarbon or a alkenylsubstituted aromatic hydrocarbon in an alkane or cycloalkane reaction solvent containing 5 to 10 carbon atoms and mixtures of such solvents to produce a monofunctional ether initiator with an extended chain or tether between the metal atom (M) and oxygen (O) in formula (II) above. Q in formula (I) is preferably derived from conjugated 1,3-dienes.

The alkali metal, preferably lithium, used in preparing the monofunctional ethers is used as a dispersion whose particle size usually does not exceed about 300 microns. Preferably the particle size is between 10 and 300 microns although coarser particle size lithium can be used. The lithium metal can contain 0.2 to 0.8 and preferably 0.3 to 0.5 weight percent sodium. The lithium metal is used in amounts of 90% of theoretical to a 40% excess above the theoretical amount necessary to produce the monofunctional alkali metal ether initiators.

The olefinic monomers used in producing the initiators are chosen from the group, of unsaturated organic compounds that can be polymerized anionically in a reaction initiated by an alkali metal or its carbanionic derivative. These olefinic monomers include 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 1,3 hexadiene, 2,5-dimethyl-2,4-hexadiene and 1,3-octadiene. Among the dialkylbutadienes, it is preferred that the alkyl groups contain from 1 to 3 carbon atoms. Numerous other olefinic monomers are disclosed, for instance, in U.S. Pat. No. 3,377,404. Polymerizable alkenyl-substituted aromatic compounds which can be anionically polymerized include styrene; alpha-methylstyrene; vinyltoluene, 1-vinylnaphthalene, 2-vinylnaphthalene, 1-alpha-methylvinylnaphthalene, 2-alpha-methylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 12. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Again, reference is made to U.S. Pat. No. 3,377,404 for disclosures of additional vinyl-substituted aromatic compounds. Non-polymerizable alkenyl substituted aromatic compounds such as 1,1-diphenylethylene may also be used.

The process of the invention for producing the initiators uses omega-protected-1-haloalkyls which include but are not limited to, 3-(1,1-dimethylethoxy)-1-halopropane, 6-(benzyloxy)-1-halohexane, 4-(methoxy)-1-halobutane, 3-(triphenylmethoxy)-1-halopropane, 3-(1,1-dimethylethoxy)-2-methyl-1-halopropane, 3-(1,1-dimethylethoxy)-2,2-dimethyl-1-halopropane, 3-(benzyloxy)-2-methyl-1-halopropane, 3-(benzyloxy)-2,2-dimethyl-1-halopropane, 6-(t-butyldimethylsilyloxy)-1-halohexane, 3-(t-butyldimethylsilyloxy)-2,2-dimethyl-1-halopropane; 3-(t-butyldimethylsilyloxy)-1-halopropane; 4-(t-butyldimethylsilyloxy)-1-halobutane and 3-(trimethylsilyloxy)-2,2-dimethyl-1-halopropane. The halo- or halide group is selected from chlorine and bromine and most preferred is the chloro group. The element A, in formula (II) above, is selected from group IVa of the periodic table and carbon and silicon are the preferred members of group IVa to use in practicing this invention the reaction temperature is above 50° C., the reaction medium is a hydrocarbon solvent and the reaction is conducted in an inert atmosphere.

Conjugated diene hydrocarbons useful in practicing this invention include but are not limited to isoprene, 1,3-butadiene, piperylene (1,3-pentadiene), 2,3-dimethyl-1,3-butadiene, 1,3-hexadiene, 2,4-hexadiene, 2,5-dimethylhexadiene and the like. Alkenylsubstituted aromatic hydrocarbons useful in practicing this invention include but are not limited to styrene, alpha-methylstyrene, vinyltoluene, 1-vinylnapthalene, 3-methylstyrene, 4-methylstyrene, 1,1-diphenylethylene and the like.

The present invention provides a process for the anionic polymerization of olefinic-containing monomers comprising the steps of:

a) initiating polymerization of a conjugated diene hydrocarbon or an alkenylsubstituted aromatic hydrocarbon at a temperature of 10° C. to 70° C. with an initiator having the formula:

$$M-Q_n-Z-OA(R^1R^2R^3) \qquad (II)$$

wherein M is an alkali metal, Q is a saturated or unsaturated hydrocarbyl group derived by incorporation of a compound selected from the group consisting of conjugated diene hydrocarbons and alkenylsubstituted aromatic hydrocarbons; Z is defined as a branched or straight chain hydrocarbon tether or connecting group which contains 3–25 carbon atoms, optionally containing aryl or substituted aryl groups; A is an element selected from the group consisting of carbon and silicon and $R^1$, $R^2$, and $R^3$ are independently selected from hydrogen, alkyl, substituted alkyl, aryl or substituted aryl groups, and n is an integer from 1 to 5; optionally reacting the polymer with water, alcohol, ethylene oxide, oxygen, carbon dioxide, silicon tetrachloride, tin tetrachloride, divinylbenzene propargyl bromide, allyl chloride, allyl bromide, sulfur, alcohols containing 1 to 10 carbon atoms and other materials known in the art to be useful for terminating end capping or coupling of polymers; optionally removing the protecting group; optionally hydrogenating the polymer; and b) recovering a linear or branched polymer having one or more terminal functional groups.

The inert solvent is preferably a non-polar solvent such as a hydrocarbon, since anionic polymerization in the presence of such non-polar solvents is known to produce polyenes with high 1,4-contents from 1,3-dienes. Preferred solvents are aliphatic and cycloaliphatic hydrocarbons having from 3 to 12, preferably from 4 to 8, carbon atoms. Examples of suitable hydrocarbons are hexane, cyclohexane, toluene and benzene. Alkanes or cycloalkanes are the most preferred solvents. Ethereal solvents can be added to the polymerization reaction to modify the microstructure of the resulting polymer, i.e., increase the proportion of 1,2, (vinyl) microstructure.

The olefinic monomer to be anionically polymerized is preferably an alkenylaromatic or a 1,3-diene. The alkenylaromatic or 1,3-diene will be chosen from the group of unsaturated organic compounds that can be polymerized anionically (i.e. in a reaction initiated by an organo-alkali metal). Suitable alkenylaromatics include the optionally-substituted styrenes and vinylnaphthalenes. Suitable 1,3-dienes will preferably contain from 4 to 12, especially from 4 to 8, carbon atoms per molecule. Examples of these compounds include the following: 1,3-butadiene, isoprene; 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene; 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Among the dialkylbutadienes, it is preferred that the alkyl groups contain from 1 to 3 carbon atoms. Of the above monomer 1,3-butadiene, isoprene, 2,3-dimethyl-1,3-butadiene and 1,3-pentadiene are preferred with 1,3-butadiene being particularly preferred. The dienes may be polymerised alone, or in admixture with each other or with alkenylaromatic compounds to form random copolymers, or by charging the dienes to the reaction mixture sequentially, either with each other or with alkenylaromatic compounds, to form block copolymers.

The following examples further illustrate the invention.

EXAMPLE 1

Preparation of 3-(1,1-Dimethylethoxy)-1-propyllithium Chain Extended with 2 Moles of Isoprene Lot 8976 (461-61)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.00 grams (0.720 mole, 2.80 equivalents) was transferred to the flask with 250 ml cyclohexane. This suspension was stirred at 450 RPMs, and heated to 63° C. with a heating mantle. The heat source was removed. 3-Chloro-1-(1,1-dimethylethoxy)propane, 38.73 grams (0.257 mole, 1.00 equivalent) was added dropwise. An exotherm was detected after 16% of the feed had been added. A dry ice/hexane cooling bath was applied to maintain the reaction temperature at 60°–65° C. The total feed time was sixty five minutes. An exotherm was noted until the last drop of feed was added, then the temperature fell off rapidly to room temperature. The reaction mixture was stirred at room temperature for forty minutes, then heated to 55° C. with a heating mantle. The heat source was removed. Isoprene, 35.05 grams (0.515 mole, 2.00 equivalents) was then added dropwise. An exotherm was noted after 34% of the feed had been added. Hexane cooling was applied to maintain the reaction temperature at 50°–55° C. The total isoprene feed time was forty two minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded a pale yellow, clear solution, yield=480 ml, 381.50 grams.

Total base=16.4 wt. %.

Active C—Li =15.7 wt %.

Yield (based on active C—Li)=90.3%.

An 85.22 gram sample of the 3-(1,1-dimethylethoxy)-1-propyllithium, chain extended with 2 moles of isoprene, Lot 8976, (total base=16.4 %, Active C—Li=15.7%), was transferred to a dry 250 ml round bottom flask. This solution was concentrated in a rotary evaporator. This afforded a slightly viscous, clear, orange oil, yield=24.99 grams.

Total base=56.3 wt %

Active C—Li=53.6 wt %

Comparative Example

Preparation of 3-(1,1-Dimethylethoxy)-1-propyllithium Lot 8888 (461-27)

A 500 ml, three-necked Morton flask was equipped with a mechanical stirrer, a 125 ml, pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 4.07 grams (0.586 mole, 2.80 equivalents) was transferred to the flask with 150 ml cyclohexane. This suspension was stirred at 450 RPMs, and heated to 70° C. with a heating mantle. The heat source was removed. 3-Chloro-1-(1,1-dimethylethoxy)propane, 31.52 grams (0.209 mole, 1.00 equivalent) was added dropwise. An exotherm was detected after 5.5% of the feed had been added. A dry ice/hexane cooling bath was applied to maintain the reaction temperature at 60°–65° C. The total feed time was fifty-two minutes. An exotherm was noted until the last drop of feed was added, then the temperature fell off rapidly to room temperature. The reaction mixture was allowed to stir at room temperature for three and a half hours, then transferred to a small pressure filter with argon pressure. Very rapid filtration was observed with 2 psi argon. The muds were reslurried with cyclohexane (2×50 ml). This afforded a pale yellow, hazy solution, yield=230 ml, 185.03 grams.

Total base=3.85wt. %

Active C—Li=3.78wt %

Yield (based on active C—Li)=27.4%

A one milliliter aliquot of this solution was withdrawn, cooled to 0° C., and carefully quenched with water. The organic layer was then analyzed by gas chromotography. A Perkin Elmer Autosystem CC, equipped with a 30 meter, 0.53 mm AT-1 column, was employed for this analysis. All the 3-chloro-1-(1,1-dimethylethoxy)propane had been consumed, with the formation of a single, lower boiling compound, identified as 1-(1,1-dimethylethoxy)propane.

This comparison example is a repeat of Example 1 except that no isoprene was added to the reaction. The product of Example 1 was more soluble in cyclohexane then was the product of the comparison example to which no isoprene was added. It is surprising that the active carbon-lithium of Example 1 was 15.7 weight percent while the comparison was only 3.78 weight percent.

EXAMPLE 2

Preparation of 3-(1,1-Dimethylethoxy)-2,2-dimethyl-1-propyllithium Chain Extended with 2 Moles of Isoprene Lot 8977 (461-63)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.10 grams (0.735 mole, 2.80 equivalents) was transferred to the flask with 250 ml cyclohexane. This suspension was stirred at 450 RPMs, and heated to 65° C. with a heating mantle. The heat source was removed. 3-Chloro-2,2-dimethyl-1-(1,1-dimethylethoxy)propane, 45.44 grams (0.254 mole, 1.00 equivalent) was added dropwise. An exotherm was detected after 10.7% of the feed had been added. A dry ice/hexane cooling bath was applied to maintain the reaction temperature at 60°–65° C. The total feed time was sixty minutes. An exotherm was noted until the last drop of feed was added, then the temperature fell off rapidly to room temperature. The reaction mixture was stirred at room temperature for forty minutes, then heated to 65° C. with a heating mantle. The heat source was removed. Isoprene, 34.61 grams (0.508 mole, 2.00 equivalents) was then added dropwise. An exotherm was noted after 5.6% of the feed had been added. Hexane cooling was applied to maintain the reaction temperature at 60°–65° C. The total isoprene feed time was thirty minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a yellow, clear solution, yield=480 ml, 380.84 grams.

Total base=17.8 wt. %.

Active C—Li=16.9 wt %.

Yield (based on active C—Li)=88.6%.

EXAMPLE 3

Preparation of 3-(t-Butyldimethylsilyloxy)-1-propyllithium Chain Extended with 2 Moles of Isoprene Lot 8983 (461-68)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.8% of the feed had been added. A dry ice/hexane cooling bath was applied to maintain the reaction temperature at 60°–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams.

Total base=17.1 wt. %.

Active C—Li=15.9 wt %.

Yield (based on active C—Li)=80.8%.

EXAMPLE 4

Preparation of 4-Methoxy-1-butyllithium Chain Extended with 2 Moles of Isoprene Lot 8984 (461-70)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×75 ml), and pentane (1×75 ml), then dried in a stream of argon. The dry dispersion, 6.30 grams (0.908 mole, 2.80 equivalents) was transferred to the flask with 250 ml cyclohexane. This suspension was stirred at 450 RPMs, and heated to 65° C. with a heating mantle. The heat source was removed. 4-Methoxy-1-chlorobutane, 39.71 grams (0.324 mole, 1.00 equivalent) was added dropwise. An exotherm was detected after 11.1% of the feed had been added. A dry ice/hexane cooling bath was applied to maintain the reaction temperature at 60°–65°C. The reaction mixture turned muddy brown about halfway through the feed. The total feed time was fifty minutes. An exotherm was noted until the last drop of feed was added, then the temperature fell off rapidly to room temperature. The reaction mixture was stirred at room temperature for sixty minutes, then heated to 62° C. with a heating mantle. The heat source was removed. Isoprene, 44.16 grams (0.648 mole, 2.00 equivalents) was then added dropwise. An exotherm was noted after 7.5% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a pale yellow, clear solution, yield=500 ml, 389.11 grams.

Total base=16.2 wt. %.

Active C—Li=15.5 wt %.

Yield (based on active C—Li)=80.9%.

EXAMPLE 5

Polymerization of Isoprene using an Initiator Prepared by Chain Extension of 3-(1,1-Dimethylethoxy)-1-propyllithium with Isoprene (8985)

To a solution of 40.31 grams of isoprene dissolved in 400 ml of dry cyclohexane at 14.7° C. was added 33.39 g of a 17.3 weight per cent solution in cyclohexane of 3-(1,1-dimethylethoxy)-1-propyllithium, chain-extended with two moles of isoprene per mole of organolithium. The solution temperature rose to 15.9° C. during addition of the initiator. The solution was then heated to 51.2° C., and then the heat source withdrawn. The temperature rose on its own to 63.4° C. at which point a cooling bath was briefly applied to moderate the reaction temperature. After about one hour the temperature had dropped to 28.5° C. The reaction mixture was allowed to stand an additional 21 hours, after which it was quenched with 40 ml of anhydrous methanol. Hexane (100 ml) was added and the layers separated. The hydrocarbon layer was washed once again with 40 ml of methanol and then stripped of solvent under vacuum at 35° C. in a RotoVap unit to constant weight. A weight of 45.2 grams of a clear somewhat viscous, easily pourable oil was obtained (Theory=46.1 g)

EXAMPLE 6

Polymerization of Isoprene using an Initiator Prepared by Chain Extension of 2,2-Dimethyl-3-(1,1-dimethylethoxy)-1-propyllithium with Isoprene (8986)

To a solution of 40.44 grams of isoprene dissolved in 400 ml (307.5 g) of cyclohexane at 19.6° C. was added 36.06 g of a 16.9 weight percent solution in cyclohexane of 2,2-dimethyl-3-(1,1-dimethylethoxy)-1-propyllithium, chain-extended with two moles of isoprene per mole of organolithium. The reactants were heated to 50° C. and reaction allowed to proceed on its own. When the temperature reached 64.1° C., the reaction mixture was cooled briefly. The reaction temperature gradually dropped to 43.1° C. after 24 minutes, and to 23.2° C. after a further 2 hours. The mixture was quenched with 40 ml of methanol after standing for 14 hours. Hexane (100 ml) was added, the layers were separated and the hydrocarbon layer washed once again with 40 ml of methanol, and then solvent-stripped under vacuum at 35° C. to constant weight. A weight of 46.4 grams of a clear, somewhat viscous oily polymer was obtained (Theory=46.44 g)

EXAMPLE 7

Polymerization of Isoprene Using an Initiator Prepared by Chain Extension of 4-Methoxy-1-butyllithium with Isoprene (8999)

To a solution of 40.11 grams of isoprene dissolved in 400 ml of cyclohexane was added 31.50 gram of a 15.5 weight percent solution of 4-methoxy-1-butyllithium chain-extended with two moles of isoprene per mole of organolithium, in cyclohexane, at 20.8° C. The solution was heated to 53.6° C., where the reaction mixture continued to generate heat on its own, the temperature of the mass rising to 63.5° C. within 4 minutes. A cooling bath was applied for a few minutes, and the reaction then allowed to proceed on its own. After about another two hours, the reaction temperature had dropped to 22° C. After standing overnight, the orange solution was quenched with 40 ml of methanol and 100 ml hexane. The hydrocarbon layer was separated and washed with another 40 ml of methanol, then stripped of solvent under vacuum. A weight of 45.8 grams of bright yellow fluid polymer was obtained.

EXAMPLE 8

Polymerization of Isoprene using an Initiator Prepared by Chain Extension of 3-(t-Butyldimethylsilyloxy)-1-propyllithium with Isoprene (9006)

To a solution of 40.09 grams of isoprene dissolved in 400 ml of dry cyclohexane was added 40.55 grams of a 15.9 weight percent solution of 3-(t-butyldimethylsilyloxy)-1-propyllithium chain-extended with two moles of isoprene per mole of organolithium in cyclohexane. The solution was stirred and heated to 51.3° C., at which point the temperature continued to rise on its own, reaching 68.1° C. before a cooling bath was applied. After about 2 hours, the reactants had cooled to 22.4° C. and the reaction mixture was allowed to stand overnight. 100 ml of hexane and 40 ml of methanol were added and the mixture stirred for one hour. The hydorcarbon layer was separated, washed again with 40 ml of methanol, and stripped of solvent under vacuum. A weight of 48.2 grams of liquid polymer was recovered.

EXAMPLE 9

Polymerization of Butadiene Using an Initiator Prepared by Chain Extension of 3-(1,1-Dimethylethoxy)1-Propyllithium with Isoprene (9036)

To a solution of 42.0 grams of butadiene dissolved in 312 grams of cyclohexane at 3.3° C. was added 3.82 grams of a 17.3 weight percent solution in cyclohexane of 3-(dimethylethoxy))-1-propyllithium chain-extended with two moles of isoprene per mole of organolithium. The mixture was heated to 35.4° C. at which point refluxing of the butadiene was noted. The reaction proceeded slowly, the temperature gradually rising to 40° C. at which point the heat was cut off. The temperature gradually rose on its own to 43° C., then was heated still further to 52.3° C.(total heating time was about 1.5 hours). After standing for 16 hours at room temperature the mixture was treated with 100 ml of hexane and 40 ml of methanol for one hour the layers were separated and the upper hydrocarbon layer washed again with 40 ml of methanol. The hydrocarbon layer was stripped of solvent under vacuum at 35° C. to yield 43 grams of a light yellow, clear slightly viscous fluid.

What is claimed is:

1. A process for the anionic polymerization of olefinic-containing monomer comprising the steps of:

a) initiating polymerization of a conjugated polyene hydrocarbon having 4 to 30 carbon atoms or a vinyl-substituted aromatic hydrocarbon in a hydrocarbon or mixed hydrocarbon-polar solvent medium at a temperature of 10° C. to 70° C. with an initiator having the formula:

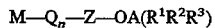

wherein M is an alkali metal selected from the group consisting of lithium, sodium and potassium; Q is an unsaturated hydrocarbyl group derived by incorporation of a conjugated diene hydrocarbon or a saturated hydrocarbyl group derived by incorporation of an alkenyl substituted aromatic hydrocarbon; Z is a branched or straight chain hydrocarbon connecting group which contains 3–25 carbon atoms, optionally containing aryl or substituted aryl groups; A is an element selected from the group consisting of carbon and silicon; $R^1$, $R^2$, and $R^3$ are independently selected from hydrogen, alkyl, and aryl groups, and n is an integer from 1 to 5 to produce an intermediate polymer; and b) reacting the intermediate polymer with a functionalizing compound to produce a functionalized polymer.

2. The process of claim 1 wherein the conjugated polyene hydrocarbon is a conjugated diene hydrocarbon selected from the group consisting of 1,3-butadiene; isoprene; 2,3-dimethyl-1,3-butadiene; 1,3-pentadiene (piperylene), 2-methyl-3-ethyl-1,3-butadiene, 3-methyl-1,3-pentadiene, 1,3-hexadiene, 2,5-dimethyl-2,4-hexadiene and 1,3-octadiene.

3. The process of claim 1 further comprising the step of hydrogenating the polymerized conjugated polyene hydrocarbon.

4. A process of claim 1, wherein said reacting step b) comprises reacting the intermediate polymer of step a) with a functionalizing compound selected from the group consisting of oxygen, ethylene oxide, carbon dioxide, propargyl chloride, propargyl bromide, allyl chloride, allyl bromide, water, sulfur, alkanols containing 1 to 10 carbon atoms, silicon tetrachloride and tin tetrachloride.

* * * * *